(12) United States Patent
Mukaida et al.

(10) Patent No.: US 12,208,870 B2
(45) Date of Patent: Jan. 28, 2025

(54) UNDERWATER VEHICLE SYSTEM AND WORKING METHOD

(71) Applicant: KAWASAKI JUKOGYO KABUSHIKI KAISHA, Kobe (JP)

(72) Inventors: Minehiko Mukaida, Kobe (JP); Hiroshi Sakaue, Kobe (JP); Noriyuki Okaya, Kobe (JP); Koichi Fukui, Akashi (JP); Yuki Kaga, Kobe (JP); Fumitaka Tachinami, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 635 days.

(21) Appl. No.: 17/276,356

(22) PCT Filed: Sep. 3, 2019

(86) PCT No.: PCT/JP2019/034535
§ 371 (c)(1),
(2) Date: Mar. 15, 2021

(87) PCT Pub. No.: WO2020/054500
PCT Pub. Date: Mar. 19, 2020

(65) Prior Publication Data
US 2022/0073175 A1    Mar. 10, 2022

(30) Foreign Application Priority Data

Sep. 14, 2018 (JP) .................................. 2018-172768

(51) Int. Cl.
*B63C 11/52* (2006.01)
*B63G 8/08* (2006.01)
(Continued)

(52) U.S. Cl.
CPC ............... *B63C 11/52* (2013.01); *B63G 8/08* (2013.01); *B63G 8/14* (2013.01); *B63G 8/39* (2013.01); *G05D 1/10* (2013.01)

(58) Field of Classification Search
None
See application file for complete search history.

(56) References Cited

U.S. PATENT DOCUMENTS 9,821,455 B1 *   11/2017   Bareddy ............... H04N 7/15
2008/0239874 A1 * 10/2008   Kemp ................. F42B 19/01
                                                              367/131
(Continued)

FOREIGN PATENT DOCUMENTS

JP        2017-71265 A        4/2017
KR    20080085509 A1 *        9/2008
(Continued)

OTHER PUBLICATIONS

Bertheas, Machine translation of WO-9113800-A, 1991, espacenet.com (Year: 1991).*

(Continued)

*Primary Examiner* — David P. Merlino
(74) *Attorney, Agent, or Firm* — Oliff PLC (57) ABSTRACT

An underwater vehicle system includes: a first underwater vehicle configured to perform work in water while moving in a predetermined proceeding direction; and a second underwater vehicle configured to replace the first underwater vehicle and perform work in water. When the second underwater vehicle replaces the first underwater vehicle, the (Continued)

second underwater vehicle approaches the first underwater vehicle based on a signal transmitted from the first underwater vehicle.

4 Claims, 5 Drawing Sheets

(51) Int. Cl.
*B63G 8/14* (2006.01)
*B63G 8/39* (2006.01)
*G05D 1/00* (2006.01)

(56) References Cited

U.S. PATENT DOCUMENTS

| | | | | |
|---|---|---|---|---|
| 2015/0268047 | A1* | 9/2015 | Morin | G01S 19/51 |
| | | | | 701/480 |
| 2015/0276959 | A1 | 10/2015 | Grimsdale | |
| 2016/0052126 | A1 | 2/2016 | Chin et al. | |
| 2016/0236760 | A1* | 8/2016 | Siesjö | B63G 8/42 |
| 2016/0253906 | A1* | 9/2016 | Celikkol | G08C 23/00 |
| | | | | 701/21 |
| 2017/0111102 | A1* | 4/2017 | Fan | H04W 4/023 |
| 2018/0297677 | A1 | 10/2018 | Sakaue et al. | |
| 2019/0033887 | A1* | 1/2019 | Beyerer | G05D 1/0692 |
| 2021/0109517 | A1* | 4/2021 | Kim | B63G 8/001 |
| 2022/0153396 | A1* | 5/2022 | Okaya | B63G 8/39 |

FOREIGN PATENT DOCUMENTS

| | | | | |
|---|---|---|---|---|
| KR | 201000043839 | A1 * | 4/2010 | |
| KR | 101469226 | B1 * | 12/2014 | |
| WO | 9113800 | A1 | 9/1991 | |
| WO | WO-9113800 | A * | 9/1991 | B63C 11/48 |

OTHER PUBLICATIONS

Lee, Machine translation of KR-101469226-B1, 2014, IP.com (Year: 2014).*

Lee, Machine translation of KR-20080085509-A1, 2008, espacenet.com (Year: 2008).*

Kim, Machine translation of KR-201000043839-A1, 2010, espacenet.com (Year: 2010).*

* cited by examiner

UNDERWATER VEHICLE SYSTEM AND WORKING METHOD

TECHNICAL FIELD

The present invention relates to an underwater vehicle system and a working method.

BACKGROUND ART

When performing work, such as inspection and repair of pipes laid in water or photography for creating a water bottom map, it is effective to use an autonomous underwater vehicle (AUV) which sails independently from a surface ship. The use of the underwater vehicle dramatically improves the degree of freedom of work. However, when performing work for a long period of time, the underwater vehicle needs to regularly return to the surface ship or a station in water, be charged or the like, and return to a work suspension spot again (see PTL 1, for example).

CITATION LIST

Patent Literature

PTL 1: Japanese Laid-Open Patent Application Publication No. 2017-71265

SUMMARY OF INVENTION

Technical Problem

In the case of using the above underwater vehicle, the work is suspended while the underwater vehicle returns to the surface ship or the like. Therefore, an entire work time including a work suspension time may increase. In other to reduce the work time, a large capacity battery may be mounted on the underwater vehicle such that the underwater vehicle can finish work without being charged. However, when the large capacity battery is mounted on the underwater vehicle, the underwater vehicle may increase in size, and this may adversely affect the operability of the underwater vehicle.

Moreover, the accuracy of positioning of an absolute coordinate system (earth coordinate system) is low in water. Therefore, when the underwater vehicle suspends the work and returns, a transmitter (transponder) serving as a mark needs to be installed at the work suspension spot such that the underwater vehicle can return to the work suspension spot.

The present invention was made under these circumstances, and an object of the present invention is to provide an underwater vehicle system and a working method, each of which can reduce a work time, can suppress increases in sizes of underwater vehicles, and does not require installation of a transmitter as a mark at a work suspension spot.

Solution to Problem

An underwater vehicle system according to one aspect of the present invention includes: a first underwater vehicle configured to perform work in water while moving in a predetermined proceeding direction; and a second underwater vehicle configured to replace the first underwater vehicle and perform work in water. When the second underwater vehicle replaces the first underwater vehicle, the second underwater vehicle approaches the first underwater vehicle based on a signal transmitted from the first underwater vehicle.

According to the underwater vehicle system, the second underwater vehicle replaces the first underwater vehicle and performs work. Therefore, a work suspension time for charging and the like is reduced, and therefore, a work time can be reduced. Moreover, since work can be performed for a long period of time without mounting large capacity batteries on the respective underwater vehicles, increases in sizes of the respective underwater vehicles by mounting the large capacity batteries can be suppressed. Furthermore, when the second underwater vehicle replaces the first underwater vehicle, the second underwater vehicle approaches the first underwater vehicle based on the signal transmitted from the first underwater vehicle. Therefore, a transmitter as a mark does not have to be installed at a work suspension spot.

In the above underwater vehicle system, when the second underwater vehicle replaces the first underwater vehicle, the second underwater vehicle may move toward a target spot located in a direction opposite to the proceeding direction when viewed from the first underwater vehicle.

According to this configuration, the second underwater vehicle can replace the first underwater vehicle in the vicinity of the target spot located in the direction opposite to the proceeding direction when viewed from the first underwater vehicle. To be specific, since the second underwater vehicle replaces the first underwater vehicle at a spot where work has already been finished by the first underwater vehicle, work omission at the time of replacement can be prevented.

In the above underwater vehicle system, when the second underwater vehicle replaces the first underwater vehicle, the second underwater vehicle may move toward a target spot located in the proceeding direction when viewed from the first underwater vehicle.

According to this configuration, the second underwater vehicle can replace the first underwater vehicle in the vicinity of the target spot located in the proceeding direction when viewed from the first underwater vehicle. Therefore, when the first underwater vehicle 10 performs work while moving forward, and then, the second underwater vehicle 30 performs work while moving backward, work omission at the time of replacement can be prevented.

In the above underwater vehicle system, the target spot may be a spot located away from the first underwater vehicle by a predetermined distance.

According to this configuration, the second underwater vehicle can be prevented from contacting the first underwater vehicle.

In the above underwater vehicle system, the second underwater vehicle may include: an acoustic positioning device configured to measure a relative position of the first underwater vehicle relative to the second underwater vehicle; and a target detector configured to detect a work target and acquire a position of the work target relative to the second underwater vehicle. When the second underwater vehicle replaces the first underwater vehicle, the second underwater vehicle may approach the first underwater vehicle by using the acoustic positioning device, and then, approach the work target by using the target detector.

According to this configuration, since the second underwater vehicle approaches the work target by using the target detector configured to detect the position of the work target, the second underwater vehicle can quickly move to the vicinity of the work target, i.e., a work start spot, and therefore, the second underwater vehicle can quickly start working.

More specifically, an underwater vehicle system according to another aspect of the present invention includes: a first underwater vehicle configured to perform work in water while moving in a predetermined proceeding direction; and a second underwater vehicle configured to replace the first underwater vehicle and perform work in water. The first underwater vehicle includes a transponder configured to transmit a sound wave to the second underwater vehicle and a propulsion device configured to move the first underwater vehicle. The second underwater vehicle includes an acoustic positioning device configured to measure a position of the second underwater vehicle relative to the first underwater vehicle based on the sound wave transmitted from the transponder of the first underwater vehicle and a propulsion device configured to, when the first underwater vehicle replaces the second underwater vehicle, move the second underwater vehicle based on the position of the second underwater vehicle relative to the first underwater vehicle such that the second underwater vehicle approaches the first underwater vehicle, the position being measured by the acoustic positioning device.

Furthermore, a working method according to yet another aspect of the present invention includes: making a second underwater vehicle approach a first underwater vehicle based on a signal transmitted from the first underwater vehicle to the second underwater vehicle; and making the second underwater vehicle perform a continuation of work performed by the first underwater vehicle.

According to this working method, the second underwater vehicle replaces the first underwater vehicle and performs work. Therefore, the work suspension time for charging and the like is reduced, and therefore, the work time can be reduced. Moreover, since work can be performed for a long period of time without mounting large capacity batteries on the respective underwater vehicles, increases in sizes of the respective underwater vehicles by mounting the large capacity batteries can be suppressed. Moreover, when the second underwater vehicle replaces the first underwater vehicle, the second underwater vehicle approaches the first underwater vehicle based on the signal transmitted from the first underwater vehicle. Therefore, a transmitter as a mark does not have to be installed at the work suspension spot.

Advantageous Effects of Invention

According to the above underwater vehicle system and working method, the work time can be reduced, and the increases in sizes of the underwater vehicles can be suppressed. In addition, the transmitter as a mark does not have to be installed at the work suspension spot.

DESCRIPTION OF EMBODIMENTS

Entire Configuration of Underwater Vehicle System

First, the entire configuration of an underwater vehicle system 100 according to the present embodiment will be described. The following will describe a case where the underwater vehicle system 100 inspects and repairs a pipe 101 (see FIG. 3, for example) laid on the bottom of water and extending linearly. It should be noted that in addition to the inspection and repair of the pipe, the underwater vehicle system 100 can also perform work, such as inspection and repair of a wire and photography for creating a water bottom map.

Figure 1:
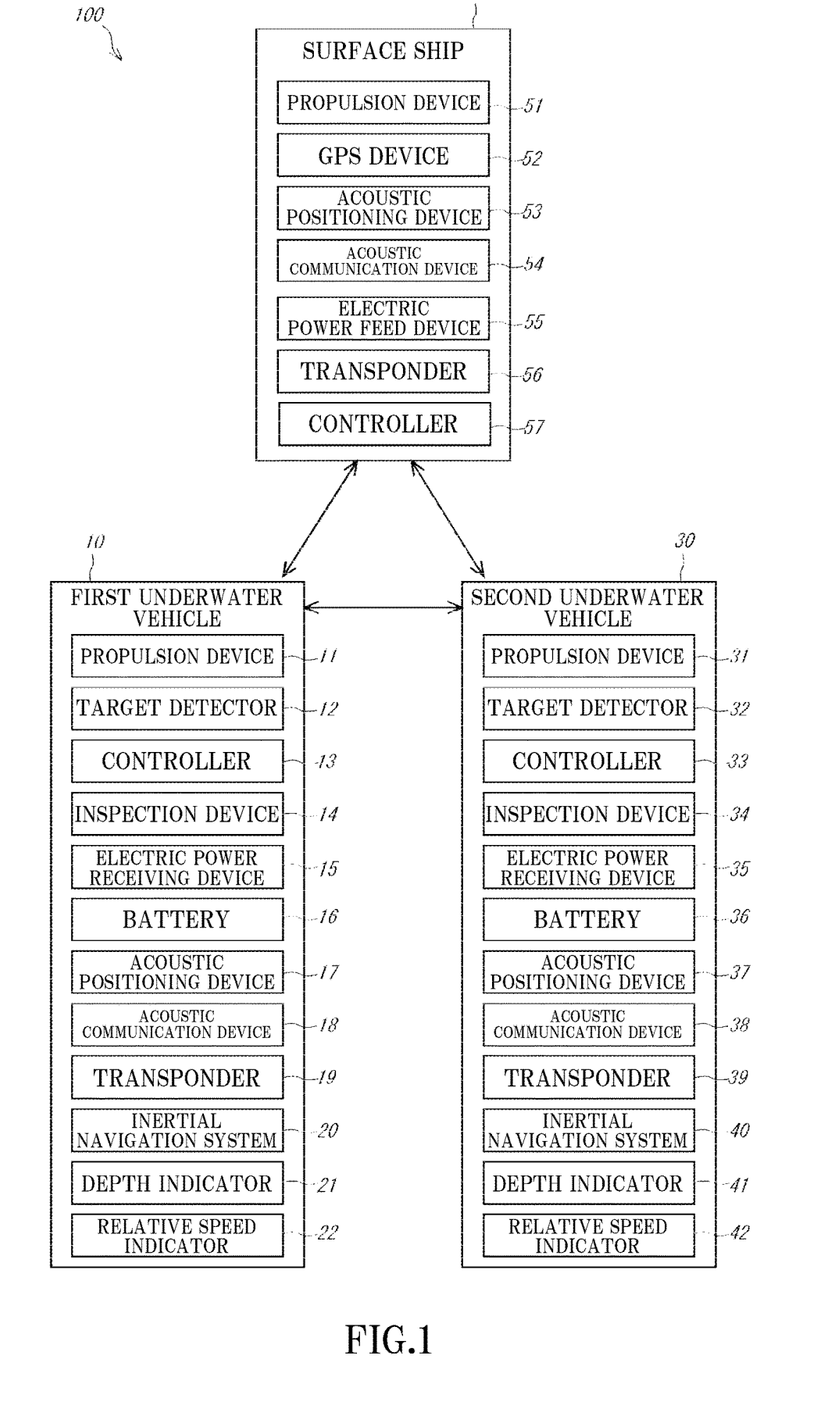
FIG. 1 is a block diagram of an underwater vehicle system.

FIG. 1 is a block diagram of the underwater vehicle system 100 according to the present embodiment. As shown in FIG. 1, the underwater vehicle system 100 includes a first underwater vehicle 10, a second underwater vehicle 30, and a surface ship 50. The first underwater vehicle 10 and the second underwater vehicle 30 alternately perform work and alternately return to the surface ship 50.

First Underwater Vehicle

The first underwater vehicle 10 is an autonomous underwater vehicle capable of sailing independently from the surface ship 50 and can perform work in water. The first underwater vehicle 10 includes a body (not shown). A propulsion device 11, a target detector 12, an inspection device 14, an electric power receiving device 15, a battery 16, an acoustic positioning device 17, an acoustic communication device 18, and a transponder 19 are provided at the body of the first underwater vehicle 10.

The propulsion device 11 generates thrust which moves the body of the first underwater vehicle 10 in water. The propulsion device 11 includes a plurality of propulsion units and a rudder device configured to change a route of the first underwater vehicle 10. Examples of the plurality of propulsion units include: a main propulsion thruster configured to move the body of the first underwater vehicle 10 forward; a vertical thruster configured to move the body of the first underwater vehicle 10 in an upper-lower direction; and a horizontal thruster configured to move the body of the first underwater vehicle 10 in a left-right direction. However, the propulsion device 11 is not limited to this and may include, for example, a swing thruster capable of changing a direction of the generation of the thrust.

The target detector 12 detects the pipe 101 as a work target and acquires work target information indicating a positional relation between the pipe 101 and the body of the first underwater vehicle 10 located in the vicinity of the pipe 101. Then, a controller 13 controls the propulsion device 11 based on the work target information acquired by the target detector 12 such that the first underwater vehicle 10 sails along the pipe 101 while maintaining a state where the body of the first underwater vehicle 10 is located within a fixed range from the pipe 101.

The target detector 12 is, for example, a multibeam sonar. The target detector 12 is, for example, provided at a front-lower portion of the body of the first underwater vehicle 10 and acquires, as the work target information, information regarding the degree of bending of the pipe 101 located in front of the first underwater vehicle 10 by a middle distance or the presence or absence of a foreign body on the pipe 101. However, the target detector 12 does not have to be the multibeam sonar and is only required to be able to acquire information by which the first underwater vehicle 10 can sail along the pipe 101. For example, the target detector 12 may be a shape recognition laser or may include both the multibeam sonar and the shape recognition laser. Moreover, the position of the target detector 12 and the number of target detectors 12 are not especially limited.

The inspection device 14 is a device configured to inspect the pipe 101 that is the work target. In the present embodiment, the inspection device 14 is an imaging camera (for example, a TV camera) which takes an image of an upper surface or side surface of the pipe 101. Video image data taken by the imaging camera that is the inspection device 14 is utilized as inspection data (work data) visually inspected by a worker.

It should be noted that the inspection device 14 is not limited to the imaging camera. Instead of or in addition to the imaging camera, the inspection device 14 may include one or both of, for example, an anticorrosion inspection unit configured to detect the degree of deterioration of an anticorrosion treatment (for example, anticorrosion coating) over the entire length of the pipe 101 and a thickness inspection unit configured to detect a thickness of the pipe 101 in order to detect the degree of corrosion and the presence or absence of damage.

The electric power receiving device 15 receives electric power supplied from a below-described electric power feed device 55 included in the surface ship 50. The battery 16 is charged based on the electric power received by the electric power receiving device 15. The electric power stored in the battery 16 is used for the operations of the above elements, such as the propulsion device 11, included in the first underwater vehicle 10.

The acoustic positioning device 17 constitutes an acoustic positioning system together with a below-described transponder 39 of the second underwater vehicle 30 or a below-described transponder 56 of the surface ship 50. The acoustic positioning system measures a relative position of the first underwater vehicle 10 relative to the transponder 39 of the second underwater vehicle 30 or the transponder 56 of the surface ship 50.

The acoustic communication device 18 communicates by sound with a below-described acoustic communication device 38 of the surface ship 50 and a below-described acoustic communication device 54 of the second underwater vehicle 30. Information (for example, the position of the first underwater vehicle 10, the direction of a nose of the first underwater vehicle 10, and a remaining amount of the battery 16) acquired by the devices included in the first underwater vehicle 10 can be transmitted from the first underwater vehicle 10 to the surface ship 50 by the acoustic communication device 18. It should be noted that the acoustic positioning device 17 and the acoustic communication device 18 may be configured integrally or separately.

The transponder 19 is used when an acoustic positioning device 37 of the second underwater vehicle 30 measures the position of the second underwater vehicle 30 relative to the first underwater vehicle 10 in order that the second underwater vehicle 30 approaches the first underwater vehicle 10. When the second underwater vehicle 30 approaches the first underwater vehicle 10 from the surface ship 50 in order to replace the first underwater vehicle 10, the acoustic positioning device 37 of the second underwater vehicle 30 transmits a sound wave to the transponder 19, and the transponder 19 which has detected the sound wave transmits a response wave (response signal) to the acoustic positioning device 37 of the second underwater vehicle 30. The acoustic positioning device 37 of the second underwater vehicle 30 measures the position of the second underwater vehicle 30 relative to the transponder 19 based on the response wave from the transponder 19. A controller 33 of the second underwater vehicle 30 controls a propulsion device 31 such that the second underwater vehicle 30 approaches the transponder 19 of the first underwater vehicle 10.

Moreover, the first underwater vehicle 10 includes an inertial navigation system (INS) 20, a depth indicator 21, and a relative speed indicator 22. The inertial navigation system 20 measures the direction, position, and speed of the first underwater vehicle 10 in the absolute coordinate system by using an acceleration sensor and a gyro sensor. The depth indicator 21 measures the depth of the first underwater vehicle 10. The relative speed indicator measures a relative movement direction and relative speed of the first underwater vehicle 10 based on fixed objects, such as the bottom of water and the pipe 101, by utilizing the Doppler effect.

The above-described controller 13 includes a processor, a volatile memory, a non-volatile memory, a SSD, an I/O interface, and the like. The SSD of the controller 13 stores various control programs, such as a below-described replacement control program, and various data. After the non-volatile memory downloads the various control programs from the SSD, the processor performs calculation processing based on the various control programs by using the volatile memory. Moreover, the controller 13 is electrically connected to the above-described devices of the first underwater vehicle 10. The controller 13 acquires various information based on measurement signals transmitted from the devices of the first underwater vehicle 10. Then, the controller 13 performs calculation based on the various information and transmits control signals to the devices of the first underwater vehicle 10.

Second Underwater Vehicle

The second underwater vehicle 30 is an autonomous underwater vehicle capable of sailing independently from the surface ship 50 and can perform predetermined work in water. The second underwater vehicle 30 is configured similarly to the first underwater vehicle 10. Specifically, the second underwater vehicle 30 includes the propulsion device 31, a target detector 32, the controller 33, an inspection device 34, an electric power receiving device 35, a battery 36, the acoustic positioning device 37, the acoustic communication device 38, the transponder 39, an inertial navigation system 40, a depth indicator 41, and a relative speed indicator 42. These devices in the second underwater vehicle 30 respectively correspond to the propulsion device 11, the target detector 12, the controller 13, the inspection device 14, the electric power receiving device 15, the battery 16, the acoustic positioning device 17, the acoustic communication device 18, the transponder 19, the inertial navigation system 20, the depth indicator 21, and the relative speed indicator 22 in the first underwater vehicle 10.

The second underwater vehicle 30 basically has the same configuration as the first underwater vehicle 10. Therefore, a detailed explanation of the second underwater vehicle 30 is omitted. The second underwater vehicle 30 of the present embodiment is configured to perform similar work to the first underwater vehicle 10. However, the second underwater vehicle 30 may perform different work from the first underwater vehicle 10. For example, the first underwater vehicle 10 may perform inspection, and the second underwater vehicle 30 may perform repair.

Surface Ship

The surface ship 50 is a surface support ship which sails on water and above the first underwater vehicle 10 or the second underwater vehicle 30 and suitably supports the first underwater vehicle 10 or the second underwater vehicle 30. Specifically, for example, the surface ship 50 supplies electric power to the first underwater vehicle 10 and the second underwater vehicle 30 and stores data acquired by the underwater vehicles 10 and 30.

The surface ship 50 which sails on water and above the first underwater vehicle 10 or the second underwater vehicle 30 does not have to be located right above the underwater vehicle 10 or 30 and is only required to sail along the pipe 101 within a range in which the surface ship 50 can support the underwater vehicle 10 or 30. Normally, the speed of the surface ship 50 is higher than each of the speeds of the underwater vehicles 10 and 30. Therefore, the surface ship 50 does not have to sail at all times while the underwater vehicle 10 or 30 is sailing. For example, even while the underwater vehicle 10 or 30 is sailing, the surface ship 50 may repeat sailing and stopping as long as the distance from the surface ship 50 to the underwater vehicle 10 or 30 falls within a range in which the surface ship 50 can support the underwater vehicle 10 or 30.

The surface ship 50 includes a propulsion device 51, a GPS (Global Positioning System) device 52, an acoustic positioning device 53, an acoustic communication device 54, the electric power feed device 55, the transponder 56, and a controller 57. The propulsion device 51 is a device configured to generate thrust by which the surface ship 50 sails on water. The GPS device 52 is a device configured to acquire positional information of the surface ship 50 on water.

The acoustic positioning device 53 constitutes an acoustic positioning system together with the transponder 19 of the first underwater vehicle 10 or the transponder 39 of the second underwater vehicle 30. The acoustic positioning system measures a relative position of the transponder 19 of the first underwater vehicle 10 relative to the surface ship 50 or a relative position of the transponder 39 of the second underwater vehicle 30 relative to the surface ship 50.

The acoustic communication device 54 communicates by sound with the acoustic communication device 18 of the first underwater vehicle 10 and the acoustic communication device 38 of the second underwater vehicle 30. Information (for example, the positions of the underwater vehicles 10 and 30, the directions of the noses of the underwater vehicles 10 and 30, and the remaining amounts of the batteries 16 and 36 of the underwater vehicles 10 and 30) acquired by the devices included in the first underwater vehicle 10 and the devices included in the second underwater vehicle 30 can be received by the acoustic communication device 54 from the underwater vehicles 10 and 30. It should be noted that the acoustic positioning device 53 and the acoustic communication device 54 may be configured integrally or separately.

The electric power feed device 55 supplies electric power to the electric power receiving device 15 of the first underwater vehicle 10 and the electric power receiving device 35 of the second underwater vehicle 30. In the present embodiment, the underwater vehicles 10 and 30 approach the surface ship 50, and electric power is supplied from the electric power feed device 55 of the surface ship 50 to the electric power receiving devices 15 and 35 of the underwater vehicles 10 and 30. The electric power feed device 55 may be a noncontact-type electric power feed device which supplies electric power to the electric power receiving devices 15 and 35 in a noncontact manner or may be a contact-type electric power feed device which supplies electric power through, for example, a connector connecting the surface ship 50 and the underwater vehicle (10, 30).

The transponder 56 is used when the underwater vehicle (10, 30) measures the position of the surface ship 50 in a case where the underwater vehicle (10, 30) needs to suspend work and return to the surface ship 50 from the vicinity of the pipe 101 to be charged, for example.

The acoustic positioning device (17, 37) of the underwater vehicle (10, 30) located in the vicinity of the pipe 101 transmits the sound wave to the transponder 56 of the surface ship 50. Then, the transponder 56 which has detected the sound wave transmits the response wave to the acoustic positioning device (17, 37). The acoustic positioning device (17, 37) measures the position of the underwater vehicle (10, 30) relative to the transponder 56 based on the response wave from the transponder 56.

It should be noted that the acoustic positioning system in the present embodiment is an USBL (Ultra Short Base Line) positioning system. To be specific, each of the acoustic positioning devices 17 and 37 includes a wave transmitter and a wave receiving array. The wave transmitter transmits the sound wave, and the wave receiving array receives the response wave transmitted from the transponder 56 which has received the sound wave. Each of the acoustic positioning devices 17 and 37 calculates a distance to the transponder 56 from a round trip time of the sound wave between the the acoustic positioning device (17, 37) and the transponder 56 and specifies the direction of the transponder 56 based on a phase difference of the response waves which have reached respective elements of the wave receiving array. As with the acoustic positioning devices 17 and 37, the acoustic positioning device 53 of the surface ship 50 is also an USBL positioning system.

It should be noted that the acoustic positioning system of the present embodiment is not limited to the USBL positioning system. For example, each of the acoustic positioning devices 17 and 37 may be a SBL (Short Base Line) positioning system in which: three or more wave receivers are provided at the body of the underwater vehicle (10, 30) so as to be spaced apart from each other; and the direction of the transponder 56 with respect to the underwater vehicle (10, 30) is specified based on a difference of arrival times of the response waves received by the wave receivers.

The controller 57 controls the entire surface ship 50 and includes a processor, a volatile memory, a non-volatile memory, a SSD, an I/O interface, and the like. The SSD of the controller 57 stores various control programs, such as a below-described replacement control program, and various data. After the non-volatile memory downloads the various control programs from the SSD, the processor performs calculation processing based on the various control programs by using the volatile memory. Moreover, the controller 57 is electrically connected to the above-described devices of the surface ship 50. The controller 57 acquires various information based on measurement signals transmitted from the devices of the surface ship 50. Then, the controller 57 performs calculation based on the various information and transmits control signals to the devices of the surface ship 50.

In the present embodiment, the underwater vehicles 10 and 30 are charged at the surface ship 50. However, the underwater vehicles 10 and 30 may be charged at a floating body or a charging station in such a manner that: the floating body is provided on water, or the charging station is provided on the seabed; and each of the floating body and the charging station is configured to have, for example, a charging function of the surface ship 50.

Operations at the Time of Replacement

Figure 2:
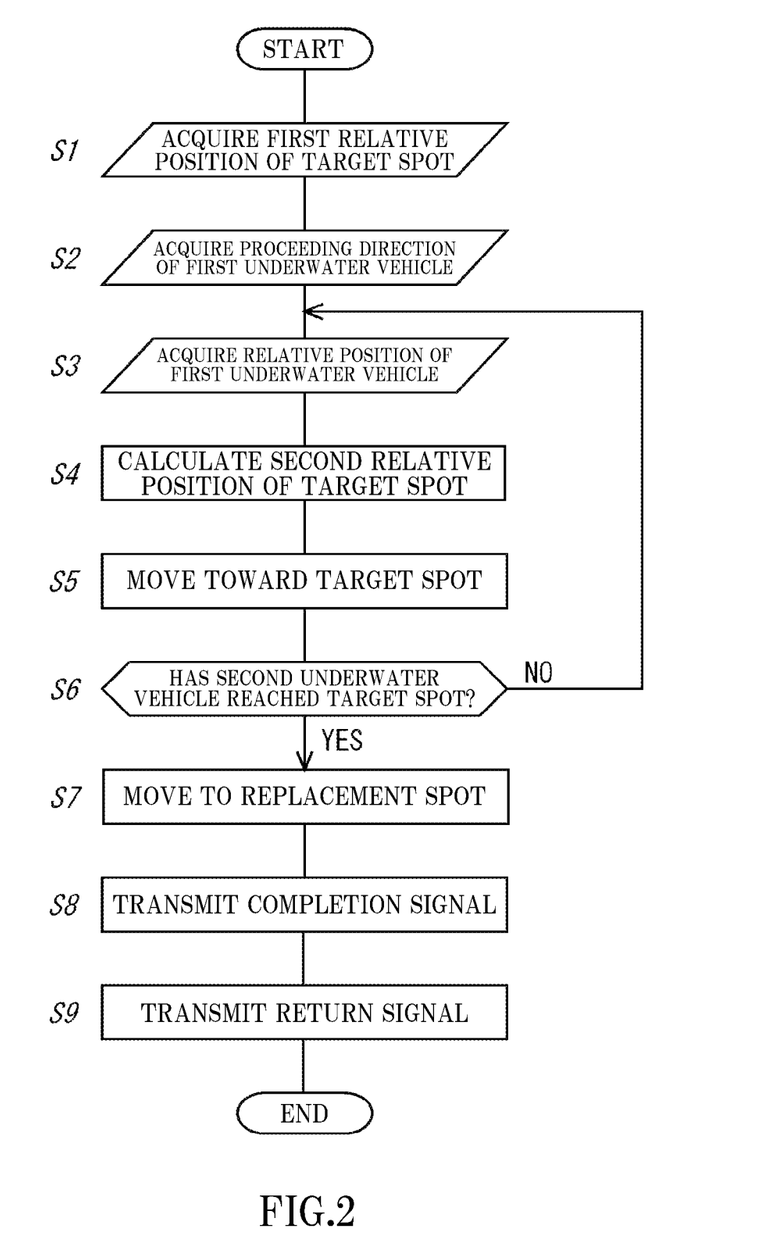
FIG. 2 is a flow chart of a replacement control program.

Next, the operations of the underwater vehicles 10 and 30 at the time of replacement will be described in accordance with the replacement control program executed when the second underwater vehicle 30 replaces the first underwater vehicle 10. FIG. 2 is a flow chart of the replacement control program. The replacement control program shown in FIG. 2 is continuously executed while the controller 13 of the first underwater vehicle 10, the controller 33 of the second underwater vehicle 30, and the controller 57 of the surface ship 50 communicate with each other.

Figure 3:
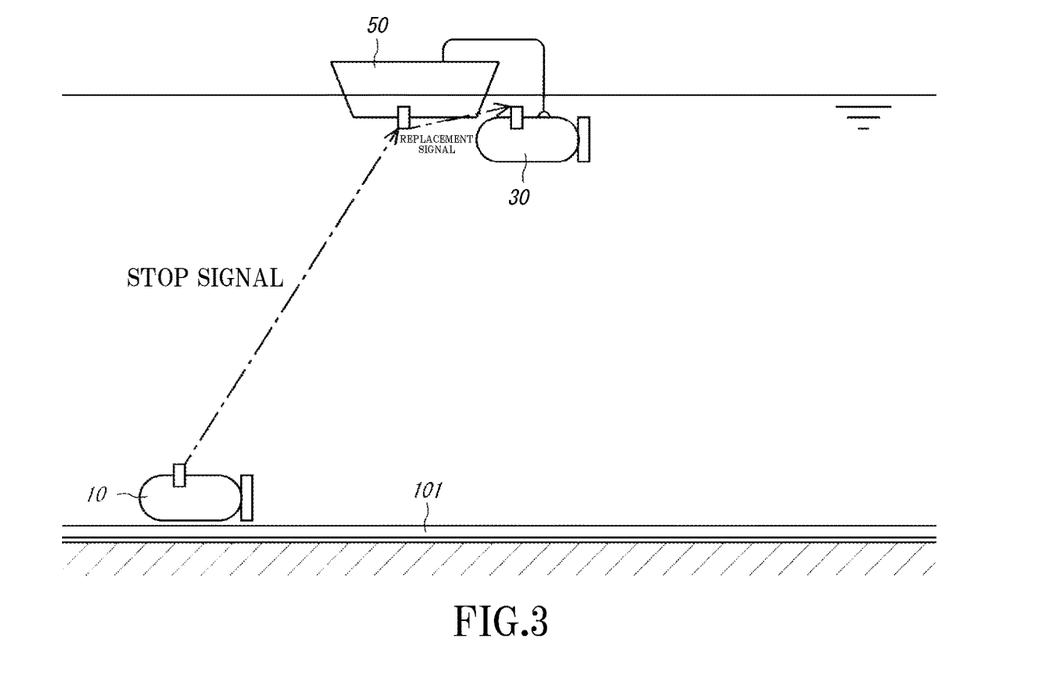
FIG. 3 is a diagram for explaining the operations of underwater vehicles at the time of replacement.

The first underwater vehicle 10 performs work while moving along the pipe 101, and when the charge amount becomes a predetermined value or less, the first underwater vehicle 10 suspends the work and stops moving. It should be noted that the replacement control program is executed also when the first underwater vehicle 10 suspends the work due to a replacement instruction from the surface ship 50, trouble of the first underwater vehicle 10, lack of a data storage capacity of the first underwater vehicle 10, or the like. Moreover, while the first underwater vehicle 10 is performing work, the second underwater vehicle 30 stands by near the surface ship 50 while being charged. When the first underwater vehicle 10 stops moving, the first underwater vehicle 10 transmits a stop signal to the surface ship 50 as shown in FIG. 3. When the surface ship 50 receives the stop signal, the surface ship 50 transmits a replacement signal to the second underwater vehicle 30. It should be noted that the transmission and reception of the signals are performed by using the acoustic communication devices 18, 38, and 54.

When the second underwater vehicle 30 receives the replacement signal, the replacement control program is executed. As shown in FIG. 2, when the replacement control program is started, the controller 33 of the second underwater vehicle 30 acquires a first relative position of a target spot (Step S1). The "target spot" denotes a spot which serves as a target when the second underwater vehicle 30 moves to a replacement spot where the second underwater vehicle 30 replaces the first underwater vehicle 10. Moreover, the "first relative position of the target spot" is a relative position of the target spot relative to the first underwater vehicle 10.

In the present embodiment, the target spot is set at a position which is away from the first underwater vehicle 10 and is located in a direction opposite to a proceeding direction when viewed from the first underwater vehicle 10 which has stopped. To be specific, the target spot is set at a spot which is on the pipe 101 and slightly behind the first underwater vehicle 10. Therefore, acquired as the "first relative position of the target spot" is information indicating a position away from the first underwater vehicle 10 by a predetermined distance in a direction which forms an angle of 180° relative to the proceeding direction of the first underwater vehicle 10 in a horizontal direction. In Step S1, the information regarding the "first relative position of the target spot" is acquired. The position of the target spot relative to the second underwater vehicle 30 does not become clear when the proceeding direction of the first underwater vehicle 10 and the position of the first underwater vehicle 10 relative to the second underwater vehicle 30 do not become clear.

Next, the controller 33 of the second underwater vehicle 30 acquires the proceeding direction of the first underwater vehicle 10 (Step S2). The proceeding direction of the first underwater vehicle 10 denotes the proceeding direction immediately before the first underwater vehicle 10 stops. When the proceeding direction of the first underwater vehicle 10 becomes clear, the direction of the target spot when viewed from the first underwater vehicle 10 (i.e., the direction which forms an angle of 180° relative to the proceeding direction of the first underwater vehicle 10 in the horizontal direction) can be grasped.

The proceeding direction of the first underwater vehicle 10 can be calculated based on the data measured by the inertial navigation system 20, but processing of calculating the proceeding direction requires time. Moreover, since the inertial navigation system 20 measures the direction of the first underwater vehicle 10 (i.e., the direction of a bow of the first underwater vehicle 10), the direction of the first underwater vehicle 10 can be estimated as the proceeding direction. However, the direction of the first underwater vehicle 10 does not necessarily coincide with the proceeding direction (a laying direction of the pipe 101). Therefore, in the present embodiment, the proceeding direction of the first underwater vehicle 10 is calculated based on the relative movement direction of the first underwater vehicle 10 measured by the relative speed indicator 22 and the direction of the first underwater vehicle 10 measured by the inertial navigation system 20. According to this method, the proceeding direction of the first underwater vehicle 10 can be acquired quickly and accurately.

Figure 4:
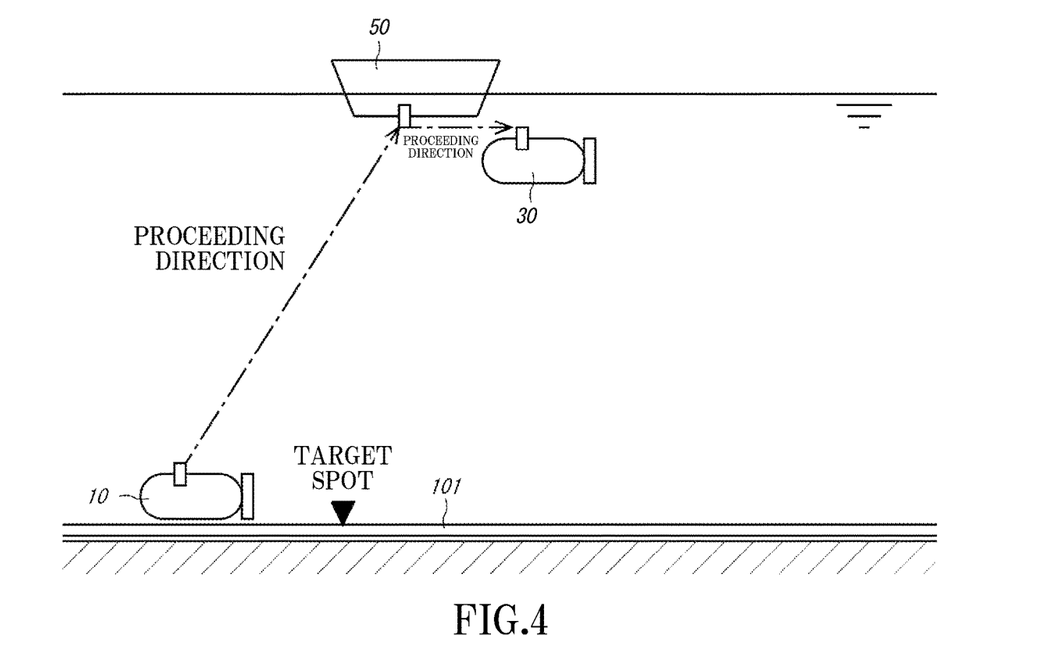
FIG. 4 is a diagram for explaining the operations of the underwater vehicles at the time of replacement.

It should be noted that in the present embodiment, the proceeding direction of the first underwater vehicle 10 is calculated by the first underwater vehicle 10. Therefore, as shown in FIG. 4, the controller 33 of the second underwater vehicle 30 acquires the proceeding direction of the first underwater vehicle 10 from the first underwater vehicle 10 through the surface ship 50. However, the second underwater vehicle 30 may directly acquire the proceeding direction of the first underwater vehicle 10 from the first underwater vehicle 10. Moreover, the surface ship 50 may acquire necessary data from the first underwater vehicle 10 and calculate the proceeding direction of the first underwater vehicle 10.

Figure 5:
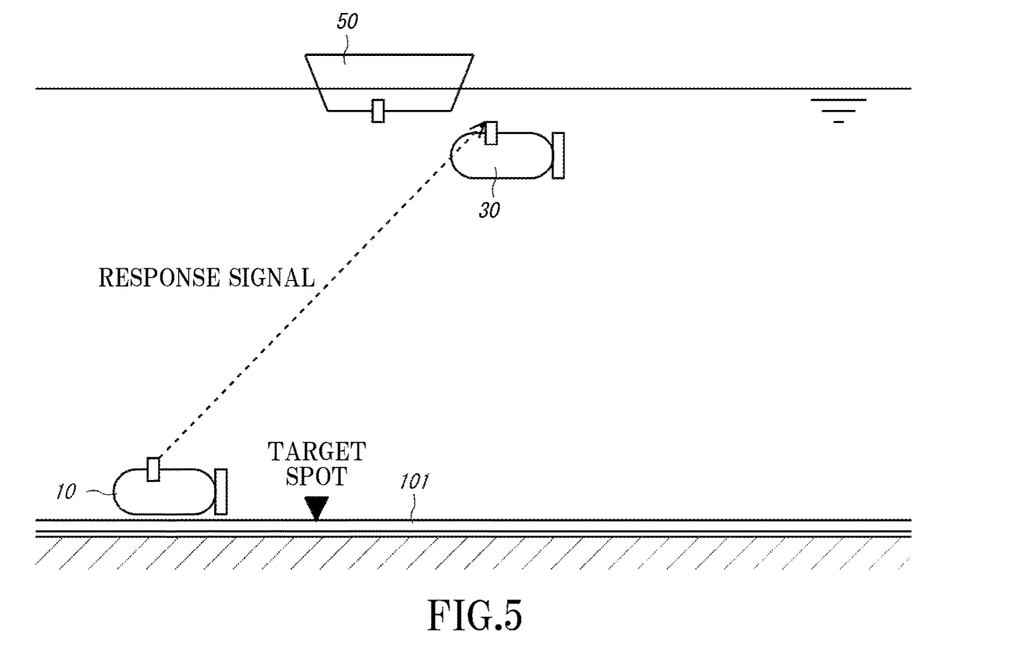
FIG. 5 is a diagram for explaining the operations of the underwater vehicles at the time of replacement.

Next, the controller 33 of the second underwater vehicle 30 acquires the relative position of the first underwater vehicle 10 relative to the second underwater vehicle 30 (Step S3). In the present embodiment, as shown in FIG. 5, the second underwater vehicle 30 acquires the relative position of the first underwater vehicle 10 relative to the second underwater vehicle 30 by using the acoustic positioning device 37 based on the response wave (response signal) transmitted from the transponder 19 of the first underwater vehicle 10.

Next, the controller 33 of the second underwater vehicle 30 calculates a second relative position of the target spot (Step S4). The "second relative position of the target spot" denotes a relative position of the target spot relative to the second underwater vehicle 30. To be specific, in Step S4, the position (first relative position) of the target spot relative to the first underwater vehicle 10 in the coordinate system is converted into the position (second relative position) of the target spot relative to the second underwater vehicle 30 in the coordinate system. The second relative position of the target spot can be calculated based on the first relative position acquired in Step S1, the proceeding direction of the first underwater vehicle 10 acquired in Step S2, and the relative position of the first underwater vehicle 10 relative to the second underwater vehicle 30 acquired in Step S3.

Next, the controller 33 of the second underwater vehicle 30 moves the second underwater vehicle 30 toward the target spot based on the second relative position of the target spot calculated in Step S4 (Step S5). With this, the second underwater vehicle 30 approaches the first underwater vehicle 10. In the present embodiment, the second underwater vehicle 30 is made to move along a route whose distance to the target spot is the shortest. However, the second underwater vehicle 30 may move along the other route.

Figure 6:
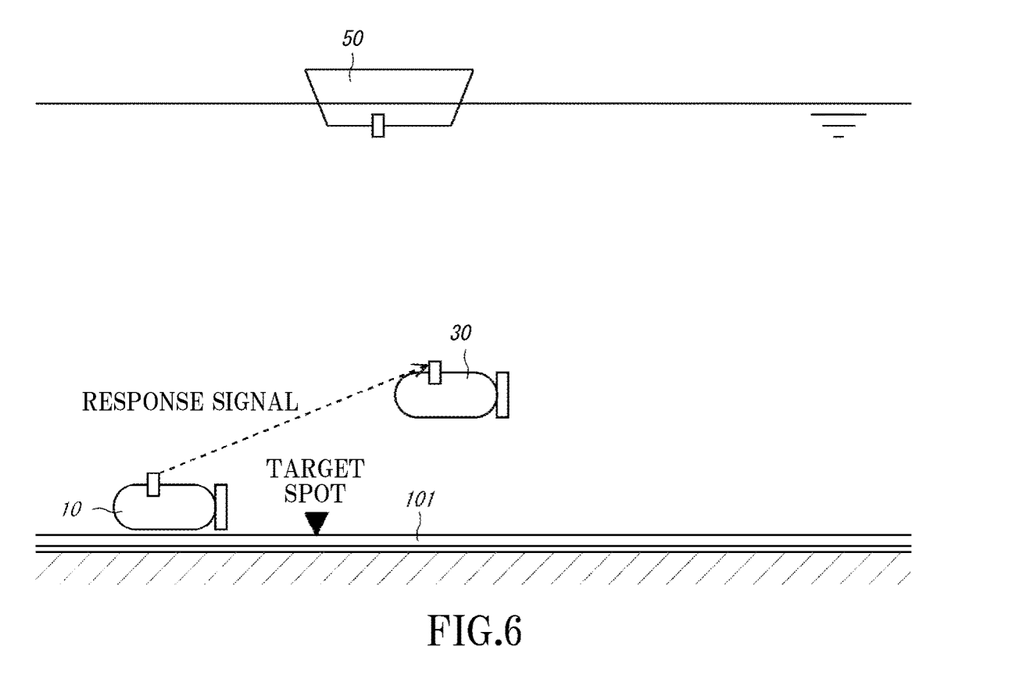
FIG. 6 is a diagram for explaining the operations of the underwater vehicles at the time of replacement.
Figure 7:
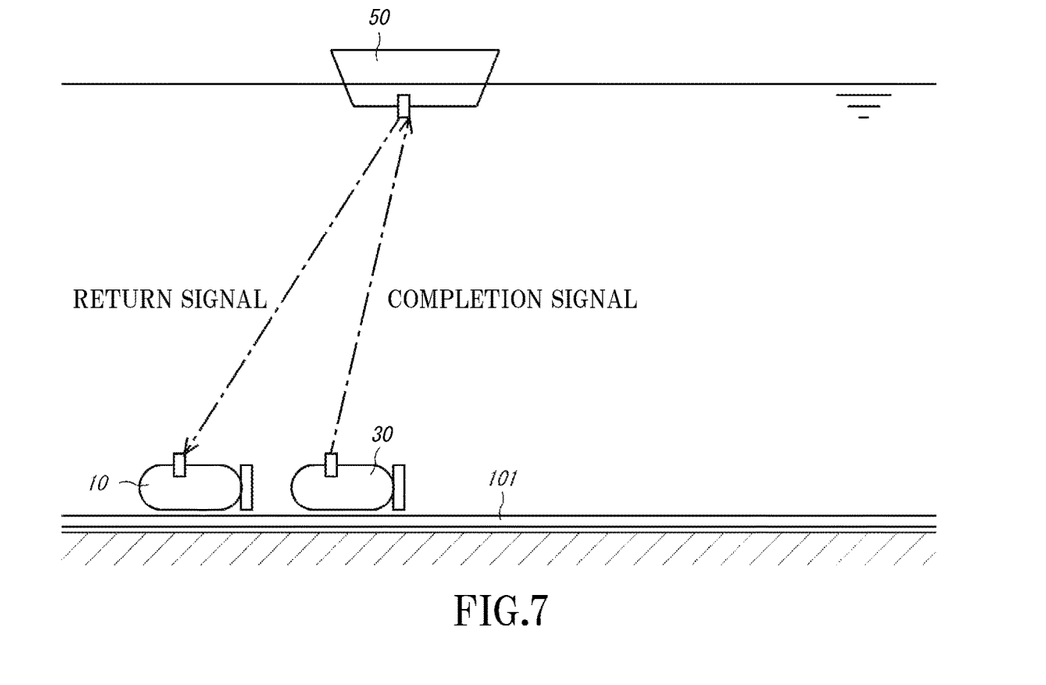
FIG. 7 is a diagram for explaining the operations of the underwater vehicles at the time of replacement.

Next, the controller 33 of the second underwater vehicle 30 determines whether or not the second underwater vehicle 30 has reached the target spot (Step S6). When the controller 33 of the second underwater vehicle 30 determines that the second underwater vehicle 30 has not reached the target spot (NO in Step S6), the controller 33 returns to Step S3 and repeats Steps S3 to S6 until the second underwater vehicle 30 reaches the target spot. It should be noted that as is clear from a comparison between FIGS. 5 and 6, when the first relative position and the proceeding direction of the first underwater vehicle 10 stay the same, but the relative positions of the second underwater vehicle 30 and the first underwater vehicle 10 change, the second relative position of the target spot (i.e., the relative positions of the second underwater vehicle 30 and the target spot) changes.

On the other hand, when the controller 33 of the second underwater vehicle 30 determines in Step S6 that the second underwater vehicle 30 has reached the target spot (YES in Step S6), the second underwater vehicle 30 is made to move to the replacement spot (Step S7). Specifically, the controller 33 of the second underwater vehicle 30 acquires an accurate position of the pipe 101 based on a measurement signal transmitted from the target detector 32 and performs position adjustment such that the second underwater vehicle 30 is located at a position right above the pipe 101, i.e., at the replacement spot. To be specific, the second underwater vehicle 30 approaches the pipe 101 that is the work target by using the target detector 32. Moreover, at this time, the controller 33 of the second underwater vehicle 30 also adjusts the posture of the second underwater vehicle 30 such that the second underwater vehicle 30 becomes parallel to the pipe 101.

Figure 8:
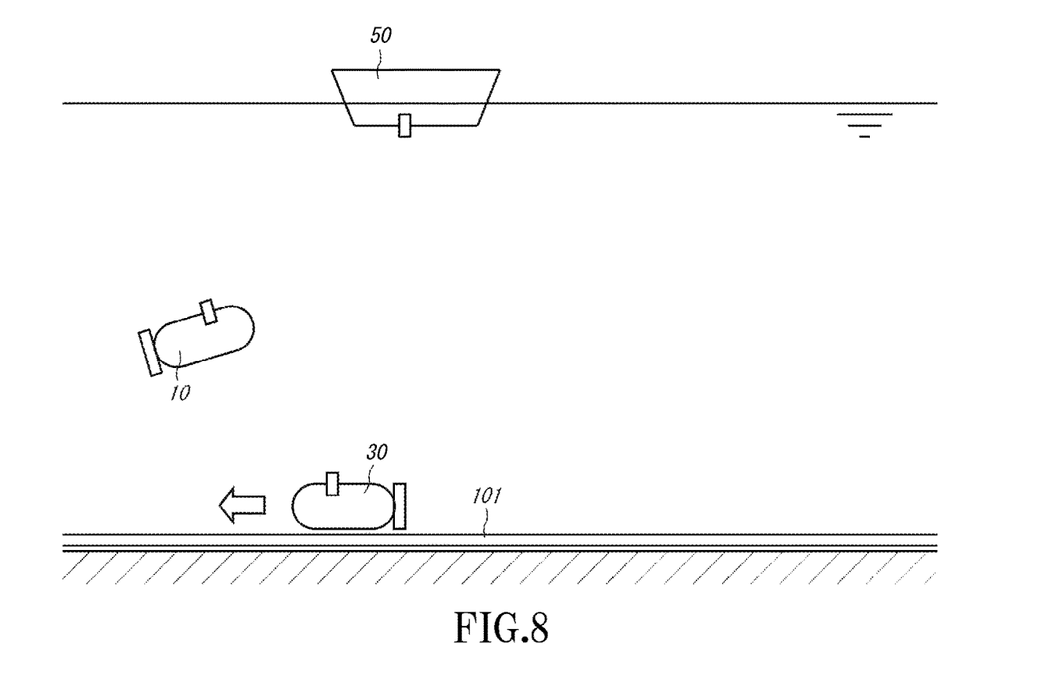
FIG. 8 is a diagram for explaining the operations of the underwater vehicles at the time of replacement.

Next, the controller 33 of the second underwater vehicle 30 transmits a completion signal to the surface ship 50 (Step S8). Then, when the controller 57 of the surface ship 50 receives the completion signal, the controller 57 of the surface ship 50 transmits a return signal to the first underwater vehicle 10 (Step S9). With this, as shown in FIG. 8, the first underwater vehicle 10 moves toward the surface ship 50. After the first underwater vehicle 10 returns to the surface ship 50, the first underwater vehicle 10 is charged. Simultaneously, the second underwater vehicle 30 starts working while moving along the pipe 101. The replacement control program is terminated after Steps S1 to S9 described above. It should be noted that the controller 33 of the second underwater vehicle 30 may directly transmit the completion signal to the first underwater vehicle 10, not the surface ship 50.

The foregoing has described the operations performed when the second underwater vehicle 30 replaces the first underwater vehicle 10. The operations when the first underwater vehicle 10 replaces the second underwater vehicle 30 are performed in the same manner as above. As above, in the present embodiment, the first underwater vehicle 10 and the second underwater vehicle 30 alternately perform work and are alternately charged. Therefore, work can be performed for a long period of time without mounting large capacity batteries on the underwater vehicles 10 and 30. On this account, the increases in sizes of the underwater vehicles 10 and 30 due to the mounting of the large capacity batteries can be suppressed.

Moreover, according to the underwater vehicle system 100 of the present embodiment, at the time of the replacement of the second underwater vehicle 30 and the first underwater vehicle 10, one of the underwater vehicles 10 and 30 can be guided to the vicinity of the replacement spot since the other of the underwater vehicles 10 and 30 serves as a mark. Therefore, a transmitter as a mark does not have to be installed at the work suspension spot when the underwater vehicle 10, 30 returns.

Moreover, according to the underwater vehicle system 100 of the present embodiment, the underwater vehicle 30 (or 10) which is moving toward the target spot converts the target spot, set based on the underwater vehicle 10 (or 30), to the relative position set based on the underwater vehicle 30 (or 10) and moves toward the target spot. According to this configuration, the spot away from the underwater vehicle 10, 30 can be set as the target spot, not the spot where the underwater vehicle 10, 30 is located. Therefore, the underwater vehicles 10 and 30 can be prevented from contacting each other at the time of replacement.

Moreover, according to the underwater vehicle system 100 of the present embodiment, the target spot is set in a direction opposite to the proceeding direction when viewed from the first underwater vehicle 10. Therefore, the second underwater vehicle 30 replaces the first underwater vehicle 10 at a spot where work has already been finished by the first underwater vehicle 10. With this, work omission at the time of replacement can be prevented.

It should be noted that in the present embodiment, the target spot is set in a direction opposite to the proceeding direction when viewed from the first underwater vehicle 10. However, the target spot is not limited to this. For example, when the first underwater vehicle 10 performs work while moving forward, and the second underwater vehicle 30 performs work while moving backward, the target spot (the first relative position of the target spot) may be set in front of or next to the first underwater vehicle 10.

One example may be such that after the first underwater vehicle 10 detects the degree of deterioration of the anticorrosion treatment by using the anticorrosion inspection unit while moving forward, the second underwater vehicle 30 performs, while moving backward, precise inspection by using an ultrasound inspection unit with respect to a portion where the deterioration of the anticorrosion treatment is significant. In this case, when the target spot is set in front of the first underwater vehicle 10, i.e., in the proceeding direction when viewed from the first underwater vehicle 10, work omission at the time of replacement can be prevented.

Moreover, the underwater vehicle system 100 according to the above embodiment includes the two underwater vehicles 10 and 30. However, the underwater vehicle system 100 according to the above embodiment may include three or more underwater vehicles, and the underwater vehicles may alternately perform work. Furthermore, in the present embodiment, the two underwater vehicles 10 and 30 alternately perform work. The replacement of the two underwater vehicles 10 and 30 may be performed only once. In this case, the underwater vehicles do not have to be charged.

Moreover, in the above embodiment, the depth indicators 21 and 41 are not used at the time of the replacement of the underwater vehicles 10 and 30. However, the depth indicators 21 and 41 may be used. For example, the second underwater vehicle 30 may be made to move downward to the same depth as the first underwater vehicle 10, and then, Steps S1 to S9 shown in FIG. 2 may be executed. According to this method, since measurement accuracy of the depth indicators 21 and 41 is high, the replacement of the underwater vehicles 10 and 30 can be accurately and quickly performed.

REFERENCE SIGNS LIST 10 first underwater vehicle
11 propulsion device
19 transponder
30 second underwater vehicle
31 propulsion device
32 target detector
37 acoustic positioning device
50 surface ship
100 underwater vehicle system

The invention claimed is:

1. An underwater vehicle system comprising:
a first underwater vehicle that is an autonomous underwater vehicle and is configured to perform work in water while moving in a predetermined proceeding direction, and configured to transmit a stop signal when the first underwater vehicle suspends the work and stops moving; and
a second underwater vehicle that is another autonomous underwater vehicle and is configured to, when the stop signal is transmitted from the first underwater vehicle, replace the first underwater vehicle and perform work in water, wherein
when the second underwater vehicle replaces the first underwater vehicle, the second underwater vehicle transmits a sound wave to the first underwater vehicle, moves downward while measuring a position of the second underwater vehicle relative to the first underwater vehicle based on a response signal that is a sound wave transmitted from the first underwater vehicle, and moves toward a target spot set at a position located away by a predetermined distance in the proceeding direction or a direction opposite to the proceeding direction when viewed from the first underwater vehicle that is in a stop state under the second underwater vehicle,
the first underwater vehicle suspending work and movement until the second underwater vehicle that is moving downward reaches the target spot, and
the second underwater vehicle moves toward the target spot while calculating a position of the second underwater vehicle relative to the target spot based on a position of the first underwater vehicle relative to the target spot, the proceeding direction, and the position of the second underwater vehicle relative to the first underwater vehicle.

2. The underwater vehicle system according to claim 1, wherein:
the second underwater vehicle includes
an acoustic positioning device configured to measure a relative position of the first underwater vehicle relative to the second underwater vehicle and
a target detector configured to detect a work target and acquire a position of the work target relative to the second underwater vehicle; and
when the second underwater vehicle replaces the first underwater vehicle, the second underwater vehicle reaches the target spot by using the acoustic positioning device, and then, approaches the work target by using the target detector.

3. An underwater vehicle system comprising:
a first underwater vehicle that is an autonomous underwater vehicle and is configured to perform work in water while moving in a predetermined proceeding direction; and
a second underwater vehicle that is another autonomous underwater vehicle and is configured to, when a stop signal is transmitted from the first underwater vehicle, replace the first underwater vehicle and perform work in water, wherein:
the first underwater vehicle includes
a transponder configured to, when the first underwater vehicle suspends the work and stops moving, transmit a response signal that is a sound wave to the second underwater vehicle in response to a sound wave transmitted from the second underwater vehicle and
a first propulsion device configured to move the first underwater vehicle, and when the first underwater vehicle suspends the work and stops moving, the first propulsion device suspends and does not resume until the second underwater vehicle moves downward and approaches the first underwater vehicle;
the second underwater vehicle includes
an acoustic positioning device configured to measure a position of the second underwater vehicle relative to the first underwater vehicle based on a response wave transmitted from the transponder of the first underwater vehicle and
a second propulsion device configured to, when the second underwater vehicle is to replace the first underwater vehicle, move the second underwater vehicle toward a target spot set at a position located away by a predetermined distance in the proceeding direction or a direction opposite to the proceeding direction when viewed from the first underwater vehicle that is in a stop state under the second underwater vehicle, while calculating a position of the second underwater vehicle relative to the target spot based on a position of the first underwater vehicle relative to the target position, the proceeding direction, and the position measured by the acoustic positioning device, and repeating movement of the second underwater vehicle.

4. A working method comprising:
while calculating a position of a second underwater vehicle, which is an autonomous underwater vehicle, relative to a target spot based on (i) a position of the second underwater vehicle relative to a first underwater vehicle, which is another autonomous underwater vehicle, the position being measured based on a response signal that is a sound wave transmitted from the first underwater vehicle to the second underwater vehicle in response to a sound wave transmitted from the second underwater vehicle when the first underwater vehicle suspends work and stops moving, (ii) a position of the first underwater vehicle relative to the target spot, and (iii) a proceeding direction of the first underwater vehicle, making the second underwater vehicle move downward and making the second underwater vehicle move toward the target spot, the target spot being set at a position located away by a predetermined distance in the proceeding direction or a direction opposite to the proceeding direction when viewed from the first underwater vehicle that is in a stop state under the second underwater vehicle; and
making the second underwater vehicle perform a continuation of work performed by the first underwater vehicle.

* * * * *